2,900,371

METHOD OF MAKING MERCAPTOBENZOTHIAZO-THIAZYL DISULFIDE AGGLOMERATES

Donald W. Hayes, Akron, Ohio, assignor to The Goodyear Tire & Rubber Company, Akron, Ohio, a corporation of Ohio No Drawing. Application July 22, 1957
Serial No. 673,144

9 Claims. (Cl. 260—79.5)

This invention relates to methods of preparing a powdered vulcanization accelerator in a new and more useful form. More specifically it relates to methods for agglomerating a powdered accelerator.

The use of powdered organic accelerators in the compounding of natural and synthetic rubber presents certain problems to the rubber goods manufacturer. For example, the finely divided nature of the accelerator causes it to be blown into the air during production operations such as milling. This loss of the accelerator represents an increase in the cost of production. Also, any finely divided powder which is blown into the air surrounding production operations results in the contamination of other materials. Then, too, certain of these accelerators create serious health hazards in production operations because, once blown into the air surrounding production operations, they cause irritation to the skin and nasal passages of the workmen exposed to the contaminated air. In addition, the fine powder-like nature of the pigments makes uniform dispersion difficult since the pigments tend to form lumps and flakes which stick to or cake on the mill rolls, thus increasing the time and effort required to form an intimate and thorough dispersion of the pigment in the rubber.

Efforts have been made to reduce the objectionable features of the powdered accelerators by converting the finely divided pigment particles into some form of agglomerate. It has usually been found that, in order to form such agglomerates, some additive must be used with the powdered pigment if the agglomerate, once formed, is to be stable. The additives frequently are materials which may be objectionable when ultimately mixed into the rubber compound with which the accelerator is to be used. Still other additives produce agglomerates which are relatively cohesive and not free-flowing, with the result that such agglomerates do not lend themselves to normal handling and weighing procedures. Other additives employed for preparing agglomerated accelerators are used in such large amounts that the rubber chemist is required to work with an unnecessarily "diluted" accelerator. Other treatments provide accelerators in agglomerated form which do not disperse readily into the rubber during the milling operation. Still other treatments result in an agglomerate which is not sufficiently stable to maintain its agglomerated form while it is transported from the manufacturer to the user. All of these objections have been overcome by preparing the powdered accelerator in an agglomerated form according to the methods of this invention.

One object of this invention is to provide for the preparation of a powdered accelerator in an agglomerated form which will substantially eliminate the tendency of the accelerator to form dust which is blown into the surrounding air during storage, shipping, weighing, and processing operations. The use of these novel forms of accelerator results in a material saving to the manufacturer, the elimination of a source of contamination, and the elimination of a health hazard to which workmen handling such materials are exposed.

Another object of this invention is to provide for the preparation of the accelerator in an agglomerated form of such a nature that the individual particles of the agglomerate will hold together during normal handling operations and yet will disperse uniformly into and through the rubber during the milling operation. Still another object is to provide for the preparation of an agglomerated organic rubber vulcanization accelerator which disperses more rapidly into the rubber during milling than will the unagglomerated powdered accelerator itself.

Another object is to prepare an agglomerated accelerator which is not cohesive but is free-flowing.

Another object is to prepare an agglomerated organic accelerator with a minimum amount of diluent. Still another object is to prepare an agglomerated accelerator which contains no materials deleterious to the compounding of the rubber with which the accelerator is to be used.

In accordance with this invention it has been found that these objects can be accomplished by mixing a minimum amount of a rubber latex of controlled plasticity with an aqueous slurry of the powdered accelerator under such conditions that the blending of the accelerator with the latex is completed before coagulation of the latex occurs.

The particular rubber accelerator to which this invention applies is mercaptobenzothiazyl disulfide.

The particular rubber latices which are employed in the practice of this invention are natural rubber latex, polychloroprene latex, polybutadiene latex, the latices of the rubbery copolymers of butadiene and styrene and the latices of the rubbery copolymers of butadiene and acrylonitrile. Of these, natural rubber latex and the latices of the rubbery copolymers of butadiene and styrene are preferred. The latex employed must have a plasticity not greater than 120 when measured according to A.S.T.M. method D927–49T using the large rotor at 212° F. It is preferred to employ latices having a Mooney plasticity of from 40 to 60.

In order to prevent the premature coagulation of the rubber latex when it is mixed with the slurry of powdered accelerator, the solids content of the latex is maintained at a maximum of 10% by weight. The dilution of the latex is necessary since the powdered accelerator from which the aqueous slurry is made usually contains a small amount of occluded acid which may cause premature coagulation of the latex.

The latex should contain an anti-oxidant, and preferably a non-discoloring anti-oxidant, in order to preserve the rubber content of the agglomerate during storage. The anti-oxidants which are employed are those commonly used with natural or synthetic rubber latex such as phenyl beta naphthyl amine, octylated diphenyl amine, N,N'-di (beta naphthyl) para-phenylene diamine and the reaction product of acetone and aniline. It is preferred, however, that the anti-oxidant used be one which does not discolor the agglomerated accelerator. Representative of these non-discoloring anti-oxidants are the styrenated and alkylated phenols and the phenyl phosphites.

In the preparation of the agglomerate it is preferred that a minimum amount of latex be employed for the reason that the users of the accelerator prefer to employ one which is as nearly chemically pure as possible and which contains a minimum amount of diluent. It has been found that latex required to produce satisfactory agglomerates of mercaptobenzothiazyl disulfide should provide at least 4 parts by weight of rubber hydrocarbon per 100 parts by weight of the powdered accelerator. While satisfactory agglomerates can be produced using as much as 20 parts by weight of rubber hydrocarbon per 100 parts by weight of accelerator, it is preferred that from 4 to 10 parts by weight be used to minimize the dilution of the accelerator by the rubber hydrocarbon while most satisfactory results are obtained using approximately 5 parts.

The diluted latex containing the anti-oxidant is mixed with an aqueous slurry of powdered accelerator which contains a water-soluble stabilizer to prevent the premature coagulation of the latex. Representative of the stabilizers which are used in the practice of this invention are sodium chloride, sodium hydroxide and potassium hydroxide. Of these, sodium chloride is preferred. The amount of stabilizer employed should be such that the pH of the accelerator slurry is between about 5.5 and 8.5. In this substantially neutral range, the premature coagulation of the latex is prevented. It has been found that the amount of stabilizer required to prevent the premature coagulation of the latex should be at least 25 parts by weight of stabilizer per 100 parts by weight of mercaptobenzothiazyl. While the amount of stabilizer may range up to 100 or more parts of stabilizer per 100 parts of accelerator, best results have been obtained in the range of from 50 to 60 parts stabilizer per 100 parts accelerator. If more than 60 parts stabilizer is used per 100 parts accelerator no further benefit is derived that would warrant the additional cost of the additional stabilizer being used. When the latex has been thoroughly mixed with the slurry of accelerator, coagulation of the latex occurs. After coagulation has been completed, the excess water is removed by filtration or decanting, using additional wash-water if necessary to remove the water-soluble stabilizer. The water content of the original mixture is reduced so that the mixture from which the agglomerates are formed contains from 50% to 70% water by weight of the total mixture. In this form the mixture has a paste-like consistency which lends itself readily to the formation of agglomerates by means of any conventional type of pellet-forming apparatus such as a granulator, molding press, corrugated rolls or an extruder. The preferred method for forming the agglomerate is to extrude the paste-like mixtures through a die provided with a plurality of small cylindrical holes. The mixture leaves the extruder in the form of strings or rods which are collected, preferably on a moving belt, and then dried. The dried agglomerate contains the solids content of the latex as the only diluent of the otherwise pure accelerator.

Further details of the practice of this invention are set forth in the following examples which are to be interpreted as representative rather than restrictive of the scope of this invention.

*Example 1*

Water (500 grams) was added to 42.7 grams of a latex prepared from 71% butadiene and 29% styrene. The latex contained 23.11% rubber hydrocarbon and 0.29% of a styrenated phenol anti-oxidant by weight. The rubber content of the latex had a Mooney plasticity (large rotor at 212° F.) of 47. This diluted latex was added to an aqueous slurry of 100 grams of sodium chloride, 190 grams of mercaptobenzothiazyl disulfide and 2480 grams of water. This aqueous mixture was thoroughly mixed until the latex had coagulated. The aqueous slurry was then filtered. The residue was reslurried in water and subsequently filtered, leaving 725 grams of residue. This was dried to 500 grams after which the mixture was extruded into long strings or rods which were dried for 16 hours at 105° F.

*Example 2*

Water (500 grams) was added to 85.4 grams of the latex described in Example 1. This diluted latex was added to an aqueous slurry of 100 grams of sodium chloride, 180 grams of mercaptobenzothiazyl disulfide and 2450 grams of water. This aqueous mixture was thoroughly mixed until the latex had coagulated. The aqueous slurry was then filtered. The residue was reslurried in water and subsequently filtered, leaving 800 grams of residue. This was dried to 490 grams after which the mixture was extruded into long strings or rods which were dried for 16 hours at 105° F.

*Example 3*

Water (500 grams) was added to 42.7 grams of the latex described in Example 1. This diluted latex was added to an aqueous slurry of 100 grams of sodium dichloride, 1.9 grams of sodium hydroxide, 190 grams of mercaptobenzothiazyl disulfide and 2490 grams of water. This aqueous mixture was thoroughly mixed until the latex had coagulated. The aqueous slurry was then filtered. The residue was reslurried in water and subsequently filtered, leaving 940 grams of residue. This was dried to 475 grams after which the mixture was extruded into long strings or rods which were dried for 16 hours at 105° F.

*Example 4*

Water (500 grams) was added to 42.2 grams of the latex described in Example 1. This diluted latex was added to an aqueous slurry of 100 grams of sodium chloride, 2200 grams of water and 190 grams of mercaptobenzothiazyl disulfide with which 6 cubic centimeters of a 28% ammonium hydroxide solution had been premixed to accelerate the wetting of the accelerator by the water. This aqueous mixture was thoroughly mixed until the latex had coagulated. The aqueous slurry was then filtered. The residue was reslurried in water and subsequently filtered, leaving 460 grams of residue. The mixture was extruded into long strings or rods which were dried for 16 hours at 105° F.

The agglomerated accelerators prepared according to Examples 1 through 4 formed stable, non-dusty agglomerates which were free-flowing. Mixing the agglomerates with rubber on a mill and in a banbury in accordance with normal practices showed that the agglomerates dispersed more rapidly and more uniformly into the rubber than did the dry powdered accelerators from whch the agglomerates were made.

In addition to the specific materials shown in the examples other latices, anti-oxidants and stabilizers may be employed in the practice of this invention with comparable beneficial results. In preparing the aqueous slurry of accelerator it has been found to be helpful to employ the wet accelerator in the form in which it occurs as it emerges from the reactor in which it is prepared, rather than to dry the accelerator and then re-wet it. If, however, dried powder accelerator it is to be used to make up the aqueous slurry, it has been found expedient to mix the dry powder with relatively small amounts of aqueous ammonia solution before large amounts of water are added for the reason that the mixture of accelerator and ammonia is wetted more readily by the water, and the make-up time required to prepare the slurry is reduced.

Thus, it will be seen that by following the practices of this invention it is possible to produce a free-flowing, stable, non-dusty, agglomerated accelerator containing only a minimum amount of diluent. The agglomerates themselves maintain their stability during storage and handling operations and yet disperse rapidly and uniformly into and through the rubber compound with which they are used.

This application is a continuation-in-part of my co-pending application Serial No. 421,978, filed April 8, 1954, now abandoned.

While certain representative embodiments and details have been shown for the purpose of illustrating the invention, it will be apparent to those skilled in this art that various changes and modifications may be made

I claim:

1. The method according to claim 8 in which the agglomerates are formed by extruding the mixture in the form of strings or rods.

2. The method according to claim 1 in which the mixture contains from 4% to 6% by weight of rubbery hydrocarbon and the anti-oxidant is a styrenated phenol.

3. The method according to claim 1 in which the water soluble, non-volatile stabilizer is present in an amount at least 50 parts by weight per 100 parts by weight of mercaptobenzothiazyl disulfide.

4. The method according to claim 3 in which the water soluble, non-volatile stabilizer is sodium chloride.

5. The method according to claim 4 in which the rubber hydrocarbon is the rubbery copolymer of butadiene and styrene.

6. The method according to claim 5 in which the latex is present in an amount such that the rubber content shall be approximately 5% by weight of said mercaptobenzothiazyl disulfide.

7. The method according to claim 9 in which the rubber portion of the latex is a rubbery copolymer of butadiene and styrene and in which the rubber content is approximately 5% by weight of mercaptobenzothiazyl and the water soluble, non-volatile stabilizer is sodium chloride present in an amount of at least 50 parts by weight per 100 parts by weight of said mercaptobenzothiazyl disulfide, and in which the agglomerates are formed by extruding the mixture in the form of strings or rods.

8. A method for preparing an agglomerated compounding ingredient for rubber which comprises forming an aqueous slurry of mercaptobenzothiazyl disulfide, a water-soluble, non-volatile stabilizer selected from the group consisting of sodium chloride, sodium hydroxide and potassium hydroxide, and a latex containing a maximum of 10% rubber hydrocarbon by weight and an anti-oxidant for the rubber portion of said latex, said latex being selected from the group consisting of natural rubber latex, polychloroprene latex, polybutadiene latex, the latices of the rubbery copolymers of butadiene and styrene and the latices of the rubbery copolymers of butadiene and acrylonitrile, and the rubber hydrocarbon content thereof having a Mooney plasticity not greater than 120, the mercaptobenzothiazyl disulfide being present in an amount of 100 parts by weight, the latex being present in an amount to provide from 4 to 10 parts rubbery hydrocarbon by weight per 100 parts of said mercaptobenzothiazyl disulfide, the water-soluble stabilizer being present in an amount of at least 25% by weight of said marcaptobenzothiazyl disulfide, water being present in said aqueous slurry in an amount so that the weight ratio of water to mercaptobenzothiazyl disulfide is at least 11.5 to 1, mixing the aqueous slurry until the rubber latex coagulates, removing excess water to reduce the total water content of the mixture to range from about 50% to about 70% by weight of the total mass, forming agglomerates of the mixture, drying and collecting the dried agglomerates.

9. A method for preparing an agglomerated compounding ingredient for rubber which comprises mixing (A) a latex containing a maximum of 10% rubbery hydrocarbon by weight and a styrenated phenol antioxidant and being selected from the group consisting of natural rubber latex, polychloroprene latex, polybutadiene latex, the latices of the rubbery copolymers of butadiene and styrene and the latices of the rubbery copolymers of butadiene and acrylonitrile, the rubbery hydrocarbon content having a Mooney plasticity not greater than 120, with (B) an aqueous slurry of mercaptobenzothiazyl disulfide and a water-soluble, non-volatile stabilizer selected from the group consisting of sodium chloride, sodium hydroxide and potassium hydroxide, the mercaptobenzothiazyl disulfide being present in an amount of 100 parts by weight, the non-volatile, water-soluble stabilizer being present in an amount of at least 25% by weight of mercaptobenzothiazyl disulfide, water being present in an amount so that the weight ratio of water to mercaptobenzothiazyl disulfide is at least 11.5 to 1, the latex being present in an amount to provide from 4 to 10 parts rubbery hydrocarbon by weight per 100 parts by weight of mercaptobenzothiazyl disulfide, mixing the aqueous slurry until the rubber latex coagulates, removing excess water to reduce the total water content of the mixture to range from about 50% to about 70% by weight of the total mass, forming agglomerates of the mixture, drying and collecting said agglomerates.

References Cited in the file of this patent

UNITED STATES PATENTS

| 2,343,835 | Smith et al. | Mar. 7, 1944 |
| 2,640,088 | Glenn et al. | May 26, 1953 |

OTHER REFERENCES

Marchionna: Latex and Its Industrial Applications, vol. 1, page 89, Rubber Age Publishing Co., 1933. (Copy in Division 50.)

UNITED STATES PATENT OFFICE
CERTIFICATE OF CORRECTION

Patent No. 2,900,371                      August 18, 1959

Donald W. Hayes

It is hereby certified that error appears in the printed specification of the above numbered patent requiring correction and that the said Letters Patent should read as corrected below.

Column 2, line 68, for "latex" read -- the latex --; column 4, lines 12 and 13, for "dichloride" read -- chloride --; line 24, for "42.2 grams" read -- 42.7 grams --; line 44, for "whch" read -- which --; column 6, line 3, for "marcaptobenzothiazyl" read -- mercaptobenzothiazyl --.

Signed and sealed this 16th day of February 1960.

(SEAL)

Attest:

KARL H. AXLINE
Attesting Officer

ROBERT C. WATSON
Commissioner of Patents